(12) United States Patent
Riddiford et al.

(10) Patent No.: US 6,709,069 B2
(45) Date of Patent: Mar. 23, 2004

(54) BRAKE BY WIRE SYSTEM WITH BTSI BASED VEHICLE OPERATION CONTROL

(75) Inventors: Bryan Peter Riddiford, Dayton, OH (US); Ernst Severin Baumgartner, Dayton, OH (US)

(73) Assignee: Delphi Technologies Inc., Troy, MI (US)

( * ) Notice: Subject to any disclaimer, the term of this patent is extended or adjusted under 35 U.S.C. 154(b) by 0 days.

(21) Appl. No.: 10/002,394

(22) Filed: Oct. 23, 2001

(65) Prior Publication Data

US 2003/0075978 A1 Apr. 24, 2003

(51) Int. Cl.$^7$ .......................... B60T 13/66; F16D 66/00; B60R 25/04
(52) U.S. Cl. ................. 303/20; 303/9.61; 303/DIG. 9; 188/1.11 R; 477/94; 70/251
(58) Field of Search .............. 303/119.1, 119.2, 303/DIG. 9, 9.61, 122, 20; 188/1.11 R, 1.11 E; 192/220.2, 220.3, 220.4; 74/483 R; 477/96, 94; 70/245, 251

(56) References Cited

U.S. PATENT DOCUMENTS

| | | | |
|---|---|---|---|
| 3,800,279 A | | 3/1974 | Thompson ................... 340/65 |
| 4,212,250 A | | 7/1980 | Burgess ....................... 105/50 |
| 4,538,228 A | * | 8/1985 | Brearey et al. .............. 364/426 |
| 4,905,802 A | * | 3/1990 | Gotoh ......................... 192/4 A |
| 4,909,096 A | * | 3/1990 | Kobayashi ................... 74/538 |
| 5,016,738 A | * | 5/1991 | Shirahama et al. .......... 192/4 A |
| 5,220,984 A | * | 6/1993 | Ruiter ......................... 192/4 A |
| 5,294,191 A | * | 3/1994 | Giorgetti et al. ............... 303/3 |
| 5,314,049 A | * | 5/1994 | Nordstrom ................... 192/4 A |
| 5,421,600 A | | 6/1995 | Jones et al. .................. 280/428 |
| 5,489,246 A | * | 2/1996 | Moody et al. ................. 477/96 |
| 5,562,568 A | * | 10/1996 | Smale .......................... 477/99 |
| 5,862,899 A | * | 1/1999 | Dahlstrom .................... 192/4 A |
| 6,082,217 A | * | 7/2000 | Wheeler ...................... 74/483 R |
| 6,139,468 A | * | 10/2000 | Goates et al. ................. 477/97 |
| 6,308,813 B1 | * | 10/2001 | Carlson ........................ 192/220.3 |

OTHER PUBLICATIONS

Patent application Publication US 2002/0092720 A1 to Schafer et al.*

* cited by examiner

Primary Examiner—Jack Lavinder
Assistant Examiner—Melody M. Burch
(74) Attorney, Agent, or Firm—Robert M. Sigler

(57) ABSTRACT

A brake by wire system is integrated with a brake transmission solenoid interlock (BTSI) unit to prevent a vehicle transmission from being shifted out of a park mode into a drive mode until a brake system operational state is determined. The BTSI is activated by a supplemental control unit, which generates a transmission release signal generated by a controller in response to simultaneous presence of a brake intent signal from one or more brake pedal sensors and a determination of an operational state of the brake system. The supplemental control unit includes a switch responsive to the transmission release signal to close the BTSI activating circuit and permit release of the transmission. In a split brake system with two brake controllers, the supplemental control unit may include a switch controlled by a logic (OR, AND) circuit or a pair of switches in an equivalent logical circuit configuration.

9 Claims, 4 Drawing Sheets

BRAKE BY WIRE SYSTEM WITH BTSI BASED VEHICLE OPERATION CONTROL

TECHNICAL FIELD

The technical field of this invention is vehicle brake systems.

BACKGROUND OF THE INVENTION

Brake by wire systems provide control of vehicle brakes by electrical signals without a mechanical or hydraulic force transmitting system between the brake pedal and the brake apply mechanisms at the wheels. Such systems may include two separate brake controllers with separate power supplies. Each control acts on two of the four wheel brake apply mechanisms, so that the loss of one of the controllers or of some of the apply mechanisms will still allow the still operating controller/apply mechanisms to stop the vehicle. Although such vehicles would normally be provided with an emergency brake such as the standard, cable operated rear brake actuator provided in all vehicles, it could also be advisable to prevent vehicle operation if less than a certain predefined portion of the brake by wire system is non-operational at the attempted initiation of vehicle motion.

Most motor vehicles with automatic transmissions are provided with a supplemental brake mechanism to prevent vehicle movement when not in use. A mechanism in the automatic transmission provides a park mode in which the transmission is locked to prevent vehicle operational movement but unlocked to permit one or more drive modes in which vehicle operational movement is allowed. In addition, most vehicles with automatic transmissions include a brake transmission shift interlock (BTSI) mechanism that prevents a shift from the park mode to a driving mode unless an activation of the brake pedal is sensed, so that the shift into a driving mode always takes place with the brakes applied. But neither of these features, as currently realized, is intended to test the brake system itself or automatically prevent vehicle operation if a brake system problem is discovered.

SUMMARY OF THE INVENTION

It is thus an object of this invention to adapt a vehicle supplemental brake system, by means of a brake transmission solenoid interlock unit, to a brake by wire system to prevent the initiation of vehicle operational movement unless a predefined portion of the brake by wire system is operational.

This object is realized in a brake by wire system for a motor vehicle having a transmission with a park mode in which vehicle operational motion is prevented and a drive mode in which vehicle operational motion is allowed and a brake solenoid transmission interlock unit effective to prevent release of the vehicle transmission from the park mode until activated. The brake by wire system has a brake intent signaling device, such as, for example, a brake pedal with at least one pedal activation indicating sensor and a brake apply mechanism. The system further has a controller programmed to activate the brake apply mechanism in response to the brake intent signaling device. The controller is further programmed to detect an operational state of the brake by wire system, for example through a diagnostic program. The controller is further programmed to generate a transmission release signal in response to simultaneous presence of the brake intent signal and detection of the operational state of the brake by wire system. The system further has a supplemental control unit responsive to the transmission release signal to activate the brake solenoid transmission interlock unit and thus permit release of the transmission from the park mode to the drive mode.

The apparatus of the invention permits different levels of control in the release of the transmission from its park mode. For example, the brake by wire system may include first and second controllers separately controlling first and second brake apply units and determining first and second operational states of the brake by wire system. In one embodiment, a transmission release signal from either one of the controllers will enable activation of the brake solenoid transmission interlock unit; but in another embodiment, transmission release signals from both of the controllers are required. In addition, the first and second operational states of the brake by wire system may be different, based on different components communicating with each of the controllers, or redundant, with a communication bus provided between the controllers to share information in determining the first and second operational states. The apparatus of the invention integrates well with the prior art brake transmission solenoid interlock systems already on most vehicles. It requires only the addition of the supplemental control unit and code in the controller(s) for determining and communicating the operational states of the brake by wire system; and it does not require the separate brake switch of the prior art brake transmission solenoid interlock systems, since the controllers already receive a brake intent signal from the sensors on the brake pedal.

DESCRIPTION OF THE PREFERRED EMBODIMENT

Figure 1:
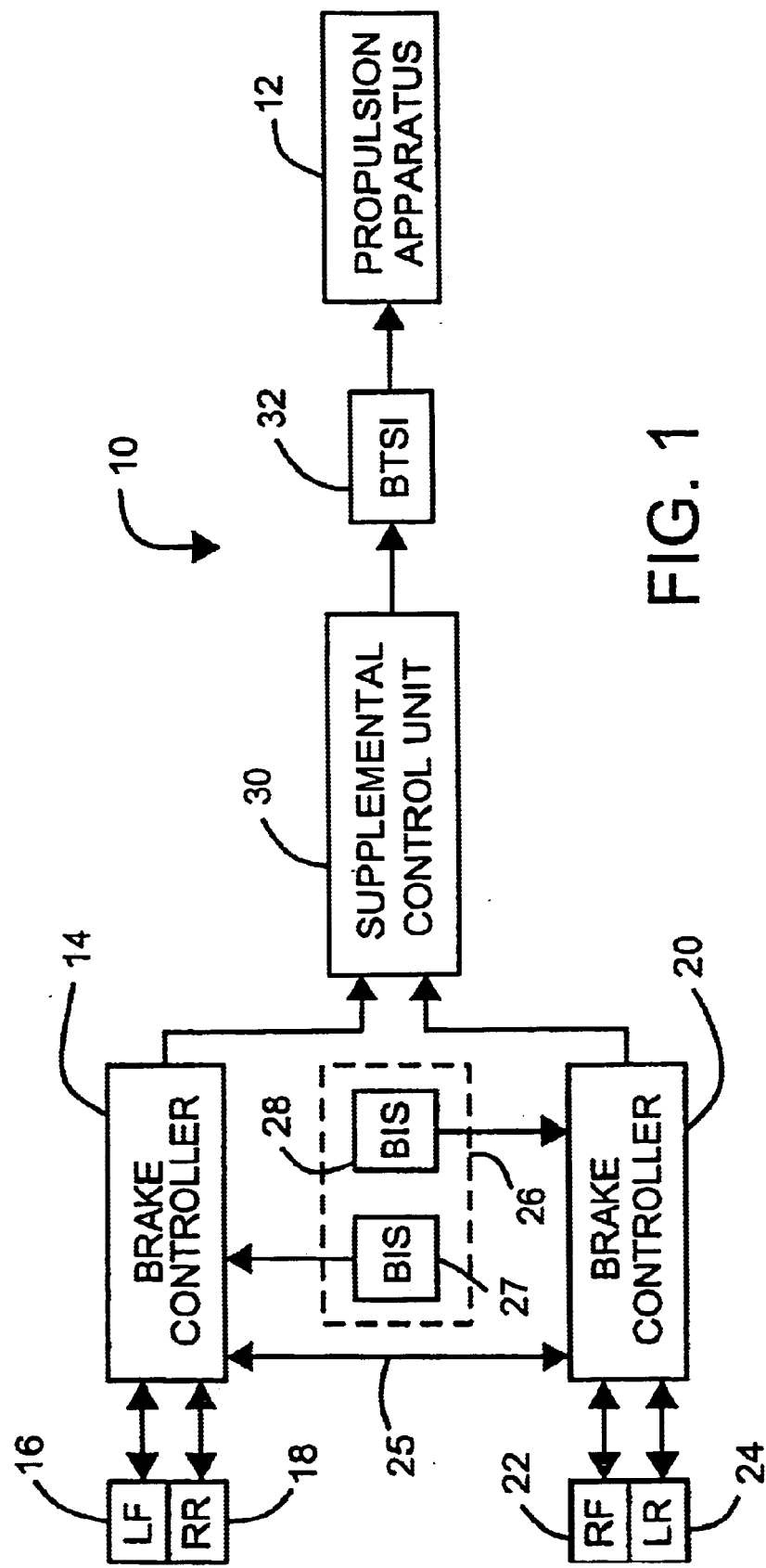
FIG. 1 is a schematic diagram of a vehicle brake by wire system according to this invention.

Referring to FIG. 1, a motor vehicle chassis 10 is provided with a propulsion apparatus 12 providing torque to one or more wheels, not shown. A brake-by-wire braking system, in a typical split diagonal arrangement, includes a first brake controller 14 controlling one or more brake units, for example a left front (LF) brake unit 16 and right rear (RR) brake unit 18, and a second brake controller 20 controlling one or more brake units, for example right front (RF) brake unit 22 and left rear (LR) brake unit 24. An operator controlled brake intent signaling device 26, such as a brake pedal, incorporates one or more sensors or switches responsive to pedal position, movement or force to provide signals to brake controllers 14 and 20 of operator intent to apply the brakes. In this embodiment two such sensors are shown: a brake pedal position sensor 27 providing a pedal position signal to controller 14 and a brake pedal force sensor 28 providing a pedal force signal to controller 20. But the number of sensors, the specific signals provided, and the controller(s) to which they are provided are a matter of design choice, as long as they are capable, either in combination or redundantly, of establishing an operator expressed intent to apply the brakes. A brake intent signal from a single sensor may be provided to each of the brake controllers, or separate brake intent signals from different sensors (such as position and force sensors) may be provided to the brake controllers.

Brake apply mechanisms (units) 16, 18, 22 and 24 include their own brake torque generating mechanisms, which may typically be fluidic or electromechanical in operation. Each of brake controllers 14 and 20 preferably includes its own microprocessor based digital computer and may be provided with a separate power supply; but they may communicate with each other via a communications bus 25. The use of separate brake controllers, power supplies, brake intent sensors, etc. provides redundancy in the system. A suitable electrical architecture is shown in related patent applications U.S. Ser. No. 09/791,381, entitled Brake by Wire System with Separate Controllers and Both Position and Force Input Sensors, filed Feb. 23, 2001 and PCT/US01/059, entitled Brake by Wire Electrical System Architecture with Multiple Power Sources and Circuit Protection, also filed Feb. 23, 2001, both applications being assigned to the assignee of this application. The relevant portions of each of these applications is incorporated herein by reference.

Propulsion apparatus 12 includes a motor or engine for generating propulsion torque and a transmission and other apparatus for controlling application of the propulsion torque to selected ones of vehicle wheels 12. Propulsion apparatus 12 further includes a brake transmission shift interlock (BTSI) unit 32, which is generally associated with and incorporated in the automatic transmission but is shown as a separate block in FIG. 1 for convenience. BTSI unit 32 is a standard device incorporating a mechanical blocking mechanism effective in a blocking position to prevent a shift of the transmission from its park mode, in which propulsion torque is removed from the drive wheels and the transmission output shaft is prevented from rotation, and thereby the vehicle is prevented from being operated. It further includes an electromagnetic solenoid capable of moving the mechanical blocking member out of its blocking position to enable transmission output shaft rotation and vehicle operation. In prior art vehicles, the BTSI solenoid coil is activated by the vehicle DC electric power source through a brake switch that provides such activation (closes) only when the vehicle brake pedal is activated. Additional means are provided to latch the mechanical blocking member in its rotation permitting position when the transmission is shifted out of its park position until it is returned to its park position, whereupon it moves back to its blocking position. This function of the BTSI unit is retained in this embodiment; but a new function is achieved with the addition of a supplemental brake unit 30.

Figure 2:
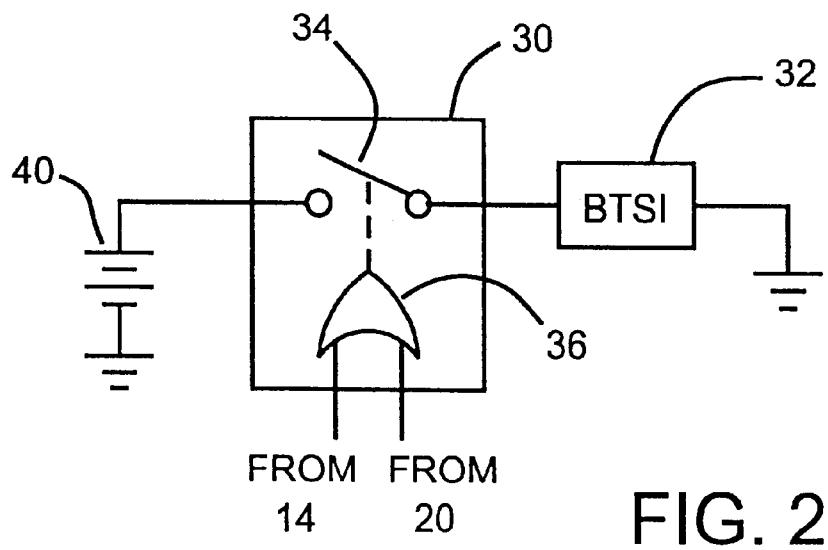
FIG. 2 shows details of a first embodiment of a supplemental control unit for use in the brake by wire system of FIG. 1.

FIG. 2 shows a first embodiment of supplemental brake unit 30 in greater detail. Essentially, it comprises a controlled switch 34, which is connected electrically in series with the BTSI unit 32 and a source 40 of DC voltage +V, which is typically the standard vehicle regulated DC power source. An activating terminal of controlled switch 34 is connected to the output of a logical OR circuit or gate 36; and the two inputs to OR gate 36 receive transmission release signals from brake controllers 14 and 20, respectively. Controlled switch 34 may comprise any suitable electrically activated and deactivated switch, such as a relays or a solid state switch such as a transistor, FET, etc.

Each of brake controllers 14 and 20 runs a diagnostic program to determine the operational capability of its own controlled part of the braking system. In addition, each controller determines, from received brake intent signal(s), when the vehicle operator is operating the brake pedal with a perceived braking intent. If the portion of the system that is diagnosed checks out as operational as such brake intent signal is received, the controller outputs a transmission release signal to its input of OR gate 36 in supplemental brake unit 30. If either controller concludes that the predefined portion of the brake by wire system is not operational, it does not provide a transmission release signal to OR gate 36. Switch 34 is thus placed in its closed or conducting state; and a circuit is completed from power source 40 through the supplemental brake unit 30 and BTSI unit 32 only if a transmission release signal is received from at least one of the controllers as the vehicle operator applies the brake pedal.

With BTSI unit 32 activated by the current through its solenoid coil, it releases a park lever or similar member to permit the transmission to be shifted out of its vehicle immobilizing park mode into any of its drive modes. Thus, the transmission can be initially shifted from its park mode to a drive mode only with the brake pedal activated and at least one of brake controllers 14 and 20 providing a transmission release signal at the time of the attempted shift. Once the shift occurs successfully, the vehicle will be operational in the normal manner until the transmission is shifted back into the park mode. If desired, the controllers may be programmed to re-run the diagnostic program upon each attempted shift from the park mode to the drive mode. Alternatively, the diagnostic program may be run only at initial vehicle start-up (ignition on).

Figure 3:
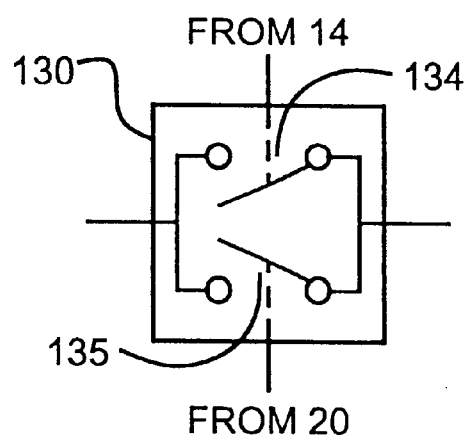
FIG. 3 shows details of a second embodiment of a supplemental control wilt that is an equivalent of the embodiment shown in FIG. 2.

Supplemental brake unit 130 of FIG. 3 is another embodiment of the arrangement shown in FIG. 2. Supplemental brake unit 130 comprises a pair of controlled switches 134 and 135 connected in parallel, so that activation of either switch will connect a circuit across the unit. In this embodiment, the switch circuit itself embodies the OR circuit construction; and the unit is thus considered an equivalent of that shown in FIG. 2.

Figure 4:
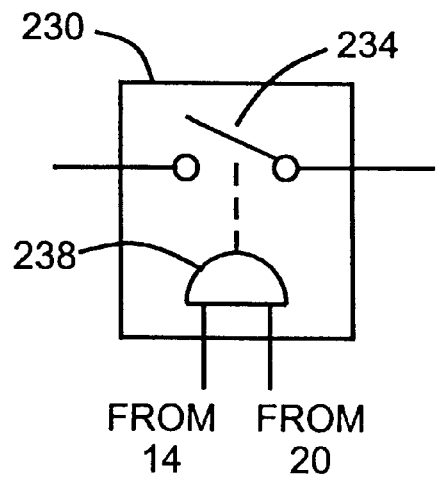
FIG. 4 shows details of a third embodiment of a supplemental control Unit for use in the brake by wire system of FIG. 1.

Supplemental brake unit 230 of FIG. 4 is an alternative embodiment which replaces the OR logic of the previous examples with AND logic, so that both transmission release signals must be received by the unit in order to complete the BTSI activating circuit. This arrangement is useful in a more conservatively designed system wherein vehicle movement will not be allowed unless both controllers are operational at the onset of vehicle operation. Switch 234 is controlled by the output of an AND circuit or gate 238, which receives the transmission release signals from controllers 14 and 20 on its two inputs. It is understood that controlled switch 234 would be connected electrically in series with power source 40 and BTSI unit 32 as shown in FIG. 2. It should also be clear that an equivalent, two-switch circuit, not requiring a separate AND circuit or gate, would comprise a pair of controlled switches connected in series, with each being controlled by a separate one of the transmission release signals from controllers 14 and 20.

Figure 5:
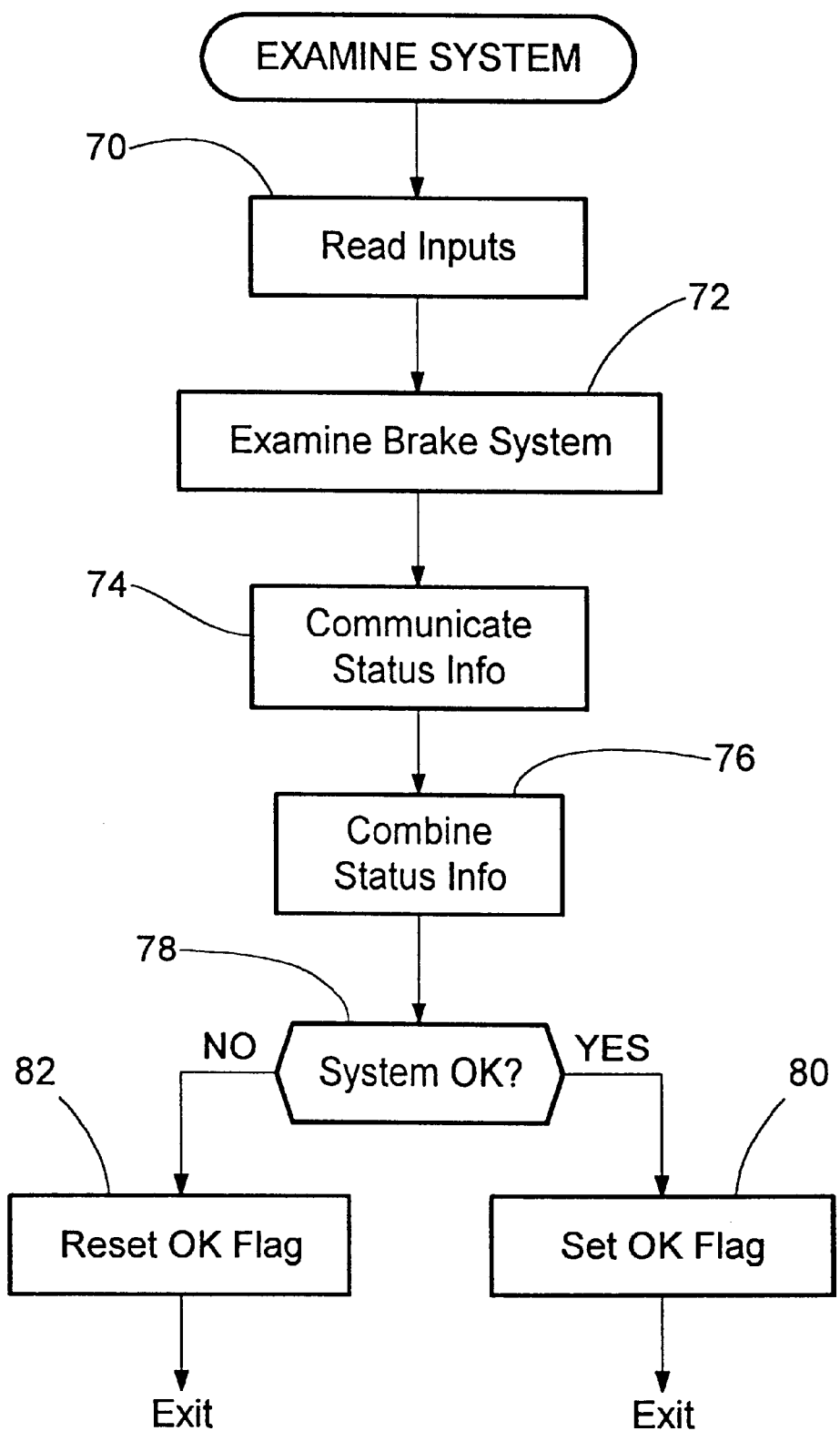
FIGS. 5 and 6 show flow charts illustrating the operation of the controllers of the brake by wire system of FIG. 1.
Figure 6:
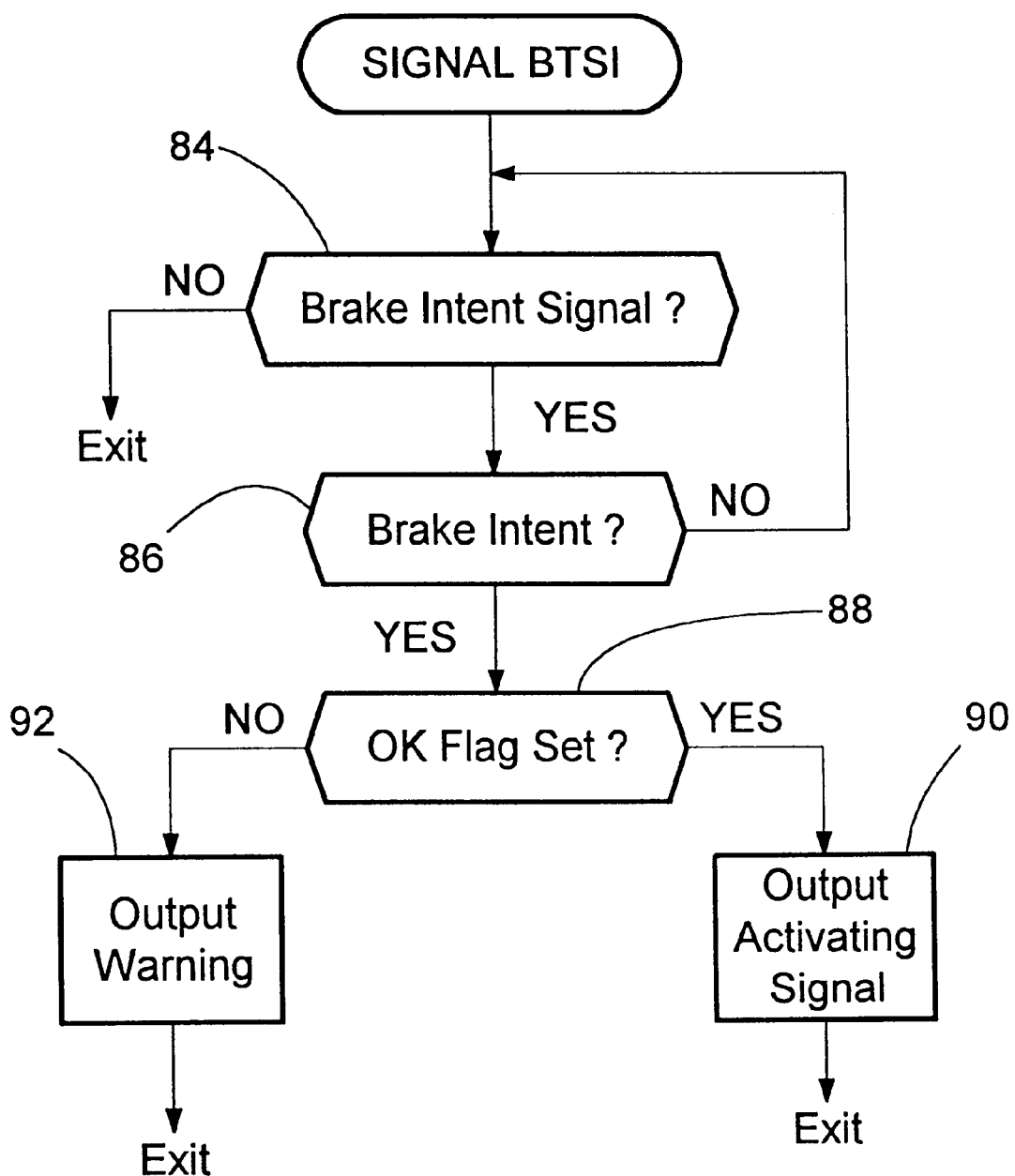

The description of the operation of the systems of FIGS. 1–4 is continued in FIGS. 5–6, with respect to the determination of brake system operational status in controllers 14 and 20. Each of the controllers includes a microcomputer that runs a stored program including diagnostic and signaling routines described in these Figures.

In a preferred embodiment of the system, a diagnostic check of the system will be run at the beginning of each ignition cycle, which may include both electrical and mechanical checks. The mechanical check may involve an automatic brake apply, which is possible in a brake by wire system. If the system checks out, an OK flag will be set; if not, the OK flag will be reset. It should be noted that this check, while permitting electric tests of the brake intent signaling sensors 27 and 28 for shorts and open circuits, etc., it does not fully test the operation of the brake intent signaling device or sensors, since their activation is under the control of the vehicle operator.

Routine EXAMINE SYSTEM is shown in the flow chart of FIG. 5. It will be run in each controller at the initiation of each activation of the brake intent signaling device, as signaled by the appropriate one of brake intent sensors 27 and 28. The routine provides for self examination of the controller's own operation, checking of the communication bus, testing of sensor operation, and similar checks. The result of the routine will be to set or reset the OK flag mentioned in the previous paragraph.

The routine begins at step 70 by reading the required inputs. These inputs will include signals from any brake intent sensors such as sensors 27 and 28. The routine then continues at step 72 by diagnostically examining its own system. This is followed at step 74 by a communication of a portion of this diagnostic data over the communication bus 25 to the other controller in a coordinated exchange. Such data might include the controller's status and that of its controlled brake apply mechanisms and various brake intent or other relevant sensors that do not communicate directly with the other sensor. At the next step 76, the controller's own information and that received from the other controller are combined as required to check total system status. In this embodiment, each controller thus has a full picture of the status of the whole system as long as both controllers and the communication bus is operating correctly. If one of the controllers is not operating correctly, or if the communication bus is faulty, each controller will have only a picture of its own status.

In either case, at step 78 the controller checks whatever diagnostic data it has against stored reference values or standards to determine the operational status of the vehicle braking system. It should be mentioned that one of the operational checks of the system may, in a shutdown option, be a separate shutdown flag which indicates whether any failure has resulted in the OK flag having been reset during this ignition cycle. If the shutdown option is chosen, a non-operational system would be reported if the shutdown flag was set, regardless of the results of the other tests. At step 80, if the system is operational according to the pre-defined standards, the OK flag is set. Alternatively, the OK flag is reset at step 82; and, if the shutdown option has been chosen, the shutdown flag is also set to prevent the resetting of the OK flag for the remainder of the ignition cycle. The routine is then exited. If the shutdown option is not chosen, the OK flag is set or reset as required each time the routine is repeated, so that the flag memory location always contains a status indicator for the braking system according to the most recent examination. If the shutdown option is chosen, the previous sentence will not be true once an OK flag is reset.

FIG. 6 is a flow chart of a routine SIGNAL BTSI which is preferably run at a higher repeat rate than routine EXAMINE SYSTEM or in response to an interrupt from a brake intent sensor. The purpose of this routine is to respond instantly to an indication that the vehicle operator has depressed the brake pedal and provide a transmission release signal to the supplemental brake unit if appropriate. It begins at step 84 with a check for a brake intent signal. If no signal is present, the program exits. But if a brake intent signal is present, the routine proceeds to step 86, where it determines if there is actual operator brake intent. This may involve nothing more than a requirement for a continuous signal for a predetermined time; or it could involve combining signals from two or more brake intent sensors to determine how far or how hard the brake pedal is being pressed, with or without a time duration requirement. In any case, if the matter is not settled (i.e., a no answer at step 86, the routine loops back to step 84 to see if the signal is still present. This loop may continue until a counter times out, if a time period is required, or until some function of position, force and/or some other brake pedal variable indicates an operator brake intent before the brake intent signal disappears. The loop will cause an exit of the program from step 84 if this does not occur; but if an operator brake intent is finally determined the program proceeds to step 88.

In step 88, the routine checks the OK flag. If it is set, the routine outputs a transmission release signal at step 90 to the supplemental brake unit 30 and exits. If it is not set, the routine does not output such a transmission release signal, but may optionally output a warning signal at step 92 to the vehicle operator that there is a brake problem and then exits.

What is claimed is:

1. A brake by wire system for a motor vehicle having a transmission with a park mode in which vehicle operational motion is prevented and a drive mode in which vehicle operational motion is allowed and a brake solenoid transmission interlock unit effective to prevent release of the vehicle transmission from the park mode until activated, the brake by wire system comprising, in combination:

a brake intent signaling device;

a brake apply mechanism;

a controller programmed to activate the brake apply mechanism in response to the brake intent signaling device, the controller being further programmed to determine an operational state of the brake by wire system and to generate a transmission release signal in response to simultaneous presence of a brake intent signal and the determination of the operational state of the brake by wire system; and a supplemental control unit responsive to the transmission release signal to activate the brake solenoid transmission interlock unit and thus permit release of the transmission from the park mode to the drive mode.

2. A brake by wire system for a motor vehicle having a transmission with a park mode in which vehicle operational motion is prevented and a drive mode in which operational motion is allowed and a brake solenoid transmission interlock unit effective to prevent release of the vehicle transmission from the park mode until activated, the brake by wire system comprising, in combination:

a brake intent signaling device;

first and second brake apply mechanisms;

a first controller programmed to activate the first brake apply mechanism in response to a first braking intent signal from the brake intent signaling device, the first controller being further programmed to determine a first operational state of the brake by wire system, the first controller being further programmed to generate a first transmission release signal in response to simultaneous presence of the first braking intent signal and a determination of the first operational state of the brake by wire system:

a second controller programmed to activate the second brake apply mechanism in response to a second braking intent signal from the brake intent signaling device, the second controller being further programmed to determine a second operational state of the brake by wire system, the second controller being further programmed to generate a second transmission release signal in response to simultaneous presence of the second braking intent signal and a determination of the second operational state of the brake by wire system; and a supplemental control unit responsive to at least one of the first transmission release signal and the second transmission release signal to activate the brake solenoid transmission interlock unit and thus permit release of the transmission from the park mode to the drive mode.

3. The brake by wire system of claim 2 in which the supplemental control unit comprises switch apparatus responsive to the first transmission release signal or the second transmission release signal.

4. The brake by wire system of claim 3 wherein the switch apparatus comprises a switch controlled by a logical OR circuit having inputs receiving the first transmission release signal and the second transmission release signal.

5. The brake by wire system of claim 3 wherein the switch apparatus comprises a pair of switches connected in parallel, one of the pair of switches being responsive to the first transmission release signal and the other of the pair of switches being responsive to the second transmission release signal.

6. The brake by wire control system of claim 2 wherein the supplemental control unit requires both the first transmission release signal and the second transmission release signal to activate the brake solenoid transmission interlock unit.

7. The brake by wire system of claim 6 wherein the supplemental brake control unit comprises a switch controlled by a logical AND circuit having inputs receiving the first transmission release signal and the second transmission release signal.

8. The brake by wire system of claim 2 wherein the first operational state of the brake by wire system signifies an operational state of the first controller and the first brake apply mechanism, the second operational state of the brake wire system signifies an operational state of the second controller and the second brake apply mechanism.

9. The brake by wire system of claim 2 wherein the brake by wire system comprises a communication bus between the first controller and the second controller and at least one component communicating with the first controller but not with the second controller, the first controller being programmed to include the operational status of the at least one component in the determination of the first operational status of the brake by wire system and to communicate the operational status of the at least one component to the second controller and the second controller being programmed to include the operational status of the at least one component in the determination of the second operational state of the brake by wire system.

* * * * *